United States Patent [19]

Rankin

[11] Patent Number: 4,811,998
[45] Date of Patent: Mar. 14, 1989

[54] STORAGE AND DISPENSING DEVICE

[76] Inventor: Joseph W. Rankin, 3770 Old Colony Dr., Canton, Ohio 44218

[21] Appl. No.: 80,907

[22] Filed: Aug. 3, 1987

[51] Int. Cl.$^4$ ............................................. A47B 77/06
[52] U.S. Cl. ................................... 312/229; 206/303; 206/372; 312/13; 312/320; 312/328
[58] Field of Search ............... 206/382, 349, 355, 372, 206/303; 312/13, 20, 326, 327, 111, 18, 328, 229

[56] References Cited

U.S. PATENT DOCUMENTS

| | | | |
|---|---|---|---|
| 895,655 | 8/1908 | Mitchell | 312/13 |
| 3,000,680 | 9/1961 | Zelenko | 312/111 |
| 3,042,469 | 7/1962 | Lowther | 312/73 |
| 3,051,537 | 8/1962 | Diehl et al. | 312/111 X |
| 3,102,635 | 9/1963 | Werwin et al. | 312/13 X |
| 3,316,039 | 4/1967 | Drobny | 312/13 X |
| 3,371,972 | 3/1968 | Fresco | 312/20 X |
| 4,253,568 | 3/1981 | Long et al. | 206/387 |
| 4,512,469 | 4/1985 | West | 206/387 |

FOREIGN PATENT DOCUMENTS 3433168 3/1986 Fed. Rep. of Germany ...... 206/387

Primary Examiner—Joseph Falk
Attorney, Agent, or Firm—Renner, Kenner, Greive, Bobak, Taylor & Weber

[57] ABSTRACT

A modular disc storage and dispensing device is shown, particularly adapted to storing and dispensing discs such as circular saw blades. The device comprises a plurality of disc-holding, pivotal, semicircular cradles positioned between pairs of slotted partition modules connected laterally together by means of fasteners. In their disc storage mode, the cradles are positioned so as to rest on the bottom of the device in an upwardly, concave position. When dispensing of a disc is required, a tab connected to the front of the cradle holding the selected disc is depressed, forcing a boss, also connected to the cradle and positioned in the slot of an adjacent partition, to move downwardly in the slot, causing the cradle to rotate upwardly to a concave forward position. As a result of the cradle's change in position, the contained disc is partially projected beyond the front of the device, where it may easily be grasped and removed.

2 Claims, 3 Drawing Sheets

STORAGE AND DISPENSING DEVICE

TECHNICAL FIELD

This invention relates to a storage and dispensing device. More particularly, this invention relates to devices for storing and dispensing relatively thin, disc-shaped objects from a modular holder. Specifically, this invention relates to a saw blade storage assembly whose capacity is modularly variable, and which is fitted with a dispensing mechanism capable of partially ejecting the saw blades from the assembly so that they can be more readily grasped.

BACKGROUND OF THE INVENTION

Oftentimes, in working with machines, systems, or assemblies, it becomes necessary or desirable to interchange or substitute their components or subassemblies to respond to differing conditions, or objectives. In such situations, it is desirable that such components or subassemblies be stored in a protected condition where they can be maintained in an organized fashion, and one which provides easy access to, and retrieval from the storage location. Such characteristics are particularly important in the case of components or subassemblies which have a similar appearance, are of a type difficult to handle without injury, and the working function of which benefits from protected storage. In the case of circular saw blades adapted for connection to motorized saws, for example, different tasks require particular types of saw blades with differing characteristics, such as the numbers and types of saw teeth, teeth with varying angular sets, and so forth. Furthermore, such saw blades benefit from organized storage, not only because it permits the accurate selection of a particular blade from among blades with only subtle variations, but also because such storage normally can be structured to provide the blades from risk of damage which would dull or otherwise injure their teeth. In addition, the sharpness of the saw blades poses a serious risk of injury when removal of the blades from storage is attempted. Many of the same, as well as other problems and considerations are involved in the storage and handling of different disc-shaped articles.

The advantages of organized storage, and ease of withdrawal of stored articles has long been recognized, and many suggestions have been made for systems and devices which make provision for avoiding the difficulties described. One such device, that taught in U.S. Pat. No. 3,316,039, for example, attempts to provide such storage for sound record tape reels. The device there disclosed is designed to respond to many of the same objectives as those achieved by the device taught herein, for example, the organized storage and dispensing of relatively thin, disc-shaped articles. However, it pursues such objectives with a distinctly different device, one employing storage units comprising deeply channeled carrier holders attached to closure plates which pivot outwardly from the housing of the device. While the device taught by the patent would appear to be capable of achieving its design objectives; unfortunately, it would necessarily entail a number of disadvantages, including undesirable fabrication costs due to the relatively involved, multi-component design of its carrier holders. In addition, it would require provision for considerably more operating clearance in front of the housing, in order to allow the pivoting of the holder units to a position in which access to the stored tapes would be possible.

DISCLOSURE OF THE INVENTION

In light of the foregoing, a first aspect of this invention is to provide a storage device capable of allowing the organization, storage, and dispensing of relatively thin, disk-like articles;

a second aspect of the invention is to provide a dispensing storage device capable of holding saw blades, and protecting the same from damage, while providing a mechanism for safely dispensing the blades with a minimal risk of injury to the user;

another aspect of the invention is the provision of a saw blade storage device which is not only optimally compact, but which requires no more space during its blade dispensing mode than during its blade storage mode;

a further aspect of the invention is to furnish a storage and dispensing device which is not only simple in design, but which incorporates a dispensing mechanism involving only one component;

an additional aspect of this invention is to provide a storage and dispensing device which is variable in capacity, that is, one which can be added to, or substracted from, simply by adding or subtracting modular components;

yet another aspect is the provision of a storage and dispensing device whose modular components can be inexpensively injection molded, and which do not require component subassembly.

The foregoing and other aspects of the invention are obtained by a disc storage and dispensing device comprising a plurality of connected partition modules, in combination with dispensing cradles adapted to hold relatively thin discs therein, one cradle being disposed between each pair of adjacent partition modules, each said cradle having actuating means located on one end thereof with a boss adjacent said means on one side of said cradle, said means extending from the front of said device between a pair of adjacent partition modules, and in its disc storage position, said boss extending through an arcuate guide slot located near the front edge of an adjacent partition module, said guide slot and said cradle both being disposed in a substantially convex position with respect to the front of said device, and when the dispensing of a disc is desired, said actuating means is pressed downward, causing said boss to follow said guide slot downward, and said cradle is thereby moved into a substantially concave position, with respect to the front of said device, forcing its contained disc to partially project from the front of the device, where the disc is easily grasped and removed.

The foregoing and other aspects of the invention are also achieved by a device for storing and dispensing circular saw blades comprising a plurality of laterally connected, flanged, partition modules, in combination with grooved, substantially semicircular dispensing cradles adapted to hold saw blades therein, one cradle being disposed between each pair of adjacent partition modules, each said cradle having an actuating tab located on one end thereof with a boss adjacent to said tab on one side of said cradle, said tab extending from the front of said device between a pair of adjacent partition modules, and in its saw blade storage position, said boss extending through the upper end of a substantially vertical, arcuate guide slot located near the front edge of an adjacent partition module, said guide slot and said cradle both being disposed in a substantially convex position with respect to the front of said device, and when the dispensing of a saw blade is desired, said actuating tab is pressed downward, causing said boss to follow said guide slot downward, and said cradle is thereby rotated into a substantially concave position with respect to the front of said device, forcing its contained saw blade to partially project from the front of the device, where the saw blade is easily grasped and removed.

BRIEF DESCRIPTION OF THE DRAWINGS

The invention will be better understood when reference is had to the drawings, in which like numbers refer to like parts, and wherein.

BEST MODE FOR CARRYING OUT THE INVENTION

Figure 1:
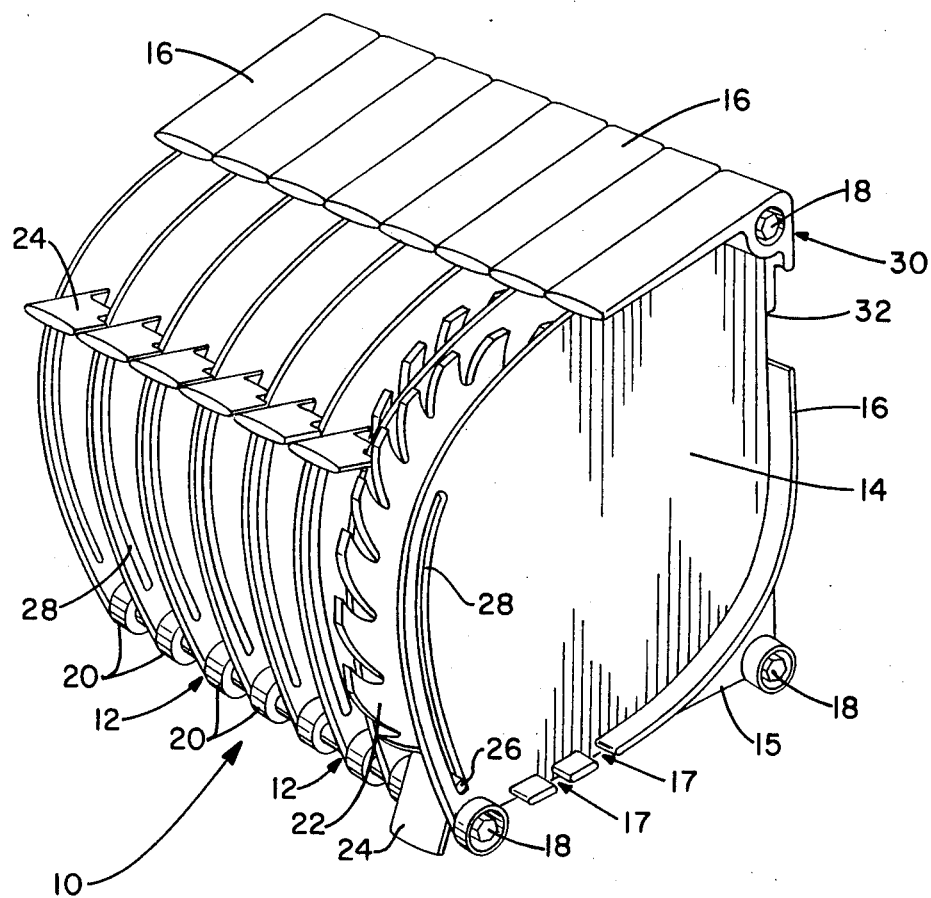
FIG. 1 is an isometric view of a storage and dispensing device of the invention used for the storage of saw blades.

FIG. 1 is an isometric view of the storage and dispensing device of the invention, indicated generally by the numeral 10. The device 10 comprises partition modules 12, including a partition wall 14, and a retainer flange 16. The retainer flange 16 is provided with drain openings 17, and an anchor fastener aperature 30. The anchor fastener aperature 30, in conjunction with the discontinuity of retainer flange 16 at the aperature offset 32 permits the device 10, for example, to be secured a wall by means of a fastener, or the like, extending through the anchor fastener aperature. Attached at the lower rear quadrant or flange 16 is a base support 15, in effect, a continuation of partition wall 14, which provides additional stability for the device. In the Figure, a number of partition modules 12 are fastened together in a modular assembly to form the saw blade storage and dispensing device 10, by means of threaded fasteners, including bolt 18, disposed in fastener housings 20. The saw blades 22 are stored between adjacent partition modules 12 on saw cradles, the actuating tabs 24 of which are shown. One of the tabs of the Figure is illustrated in its lower dispensing mode, while the balance of such tabs are shown in their upper, storage position. FIG. 1 illustrates the use of seven partition modules 12 in the saw blade storage and dispense device 10. The number of the partition modules 12 employed can be varied as desired, the objective being to provide adequate storage for the number of blades to be housed, as well as to provide a device which is inherently stable, that is, one capable of standing alone without having a significant tendency to tip laterally. It will be appreciated that the number of partition modules 12 required to accomplish stability will depend upon the dimensions of the discs to be stored, and consequently, may vary from device to device. In some instances, it has been found desirable to provide a carrying handle for a group of assembled partition modules 12 to facilitate their transportion from one location to another. Such handle can be fashioned and fastened in any of the ways known to the art.

Figure 2:
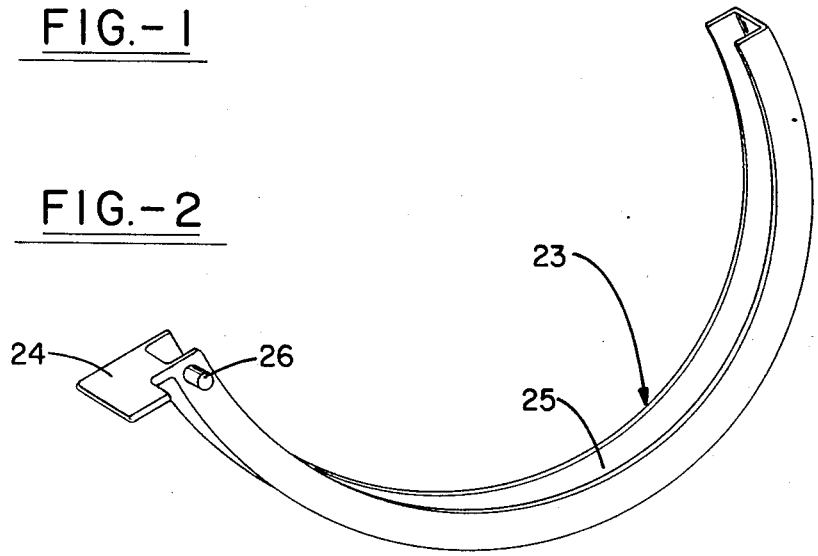
FIG. 2 is an isometric view of the dispensing cradle of the invention.

FIG. 2 is an isometric view of the dispensing cradle of the invention, shown generally by the numerical 23, comprising an arcuate portion with a receiving groove 25, and having actuating means, in the case of the Figure, a tab 24 located on one end thereof. Located adjacent to the tab 24 is a cradle boss 26, adapted to be received by a slot 28 of the partition module 12. The shape of the saw cradle 23 is generally arcuate, and preferably it will take the form of a semicircle. If desired, the length of the cradle may vary somewhat, for example, either be shorter or longer than a 180° semicircle, for instance, it may be from about 135° to 225°. The dimensions of the cradle 23 will depend upon the other dimensions of the storage and dispensing device 10, but when used in connection with saw blades of from about 8 to 12 inches in diameter, the radius of the arcuate portion will have at least a substantially equivalent radius, while the groove will ordinarily be about ⅜ inches wide, and have a similar depth. Although the cradle may have a flat, or substantially curved transverse cross-section, the use of a groove, such as that shown in the Figure, is preferred. Although a projecting tab 24 is shown as the actuating means of the cradle 23, means having other equivalent projecting shapes can also be employed.

Figure 3:
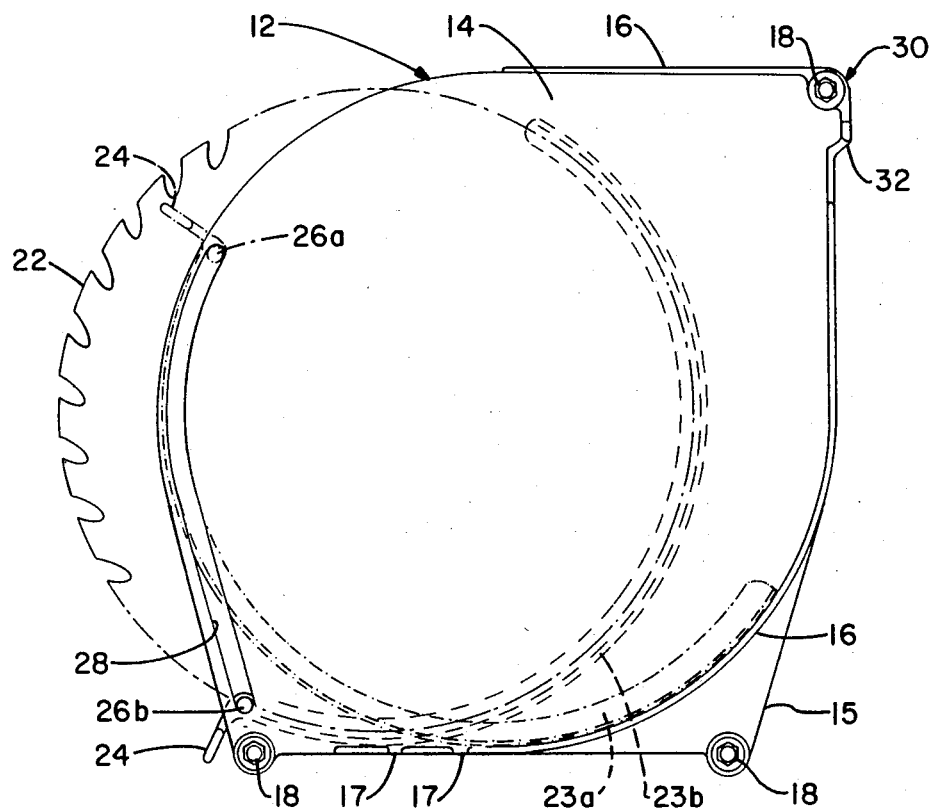
FIG. 3 is a side elevation of the storage and dispensing device showing phantom views of the dispensing cradle in both its storage and dispensing modes.

FIG. 3 illustrates a side elevation of the storage and dispensing device showing phantom view of the dispensing cradle in both its storage and dispensing modes. In the Figure, there is shown a partition module 12 comprising a partition wall 14, in combination with a retainer flange 16, the latter having drain openings 17 disposed therein. Also shown is a base support 15 and an aperature offset 32. FIG. 3 also illustrates in phantom the storage mode of the saw cradle 23a, in which the boss 26a is located near the upper end of guide slot 28, as well as a view of the cradle in its dispensing mode 23b, where the boss 26b has been pressed downward to the lower end of the slot by means of saw cradle tab 24. As may be seen, when the tab 24 is pressed downward, the saw cradle 23 is moved from its storage position in which it is disposed in a substantially convex position with respect to the front of the device 10, to a position in which the cradle assumes a generally concave position with respect to the front of the device, causing the contained saw blade 22 to partially project beyond the front of the device, allowing it to be easily grapsed and removed. While the saw blade storage and dispensing device 10 of the invention may be used for a variety of discs ranging in thickness and diameter, it has been found to be particularly useful in connection with discs from about 8 to 12 inches in diameter, and particularly with circular saw blades having such diameters. Ordinarily the wall thickness of the various parts of the components making up the device 10 will be dictated by the strength required for such components, but generally it will be from about ⅛ inch to ⅜ inch thick for saw blades of the dimension described. Likewise, the dimensions of slot 28, and the boss 26 may vary as dictated by the use to which the device 10 is to be put; however, again with saw blades of the size described, the slot will usually be about ¼ inch wide, with the boss having a diameter slightly less than that, in order to move freely in the slot The shape of the slot 28 may also vary somewhat, but will be generally acrucate, and will substantially follow the front edge of partition wall 14, while being slightly inwardly displaced therefrom. Commonly, the upper portion of slot 28 will have a greater curvature than the lower portion thereof, the objective being to achieve a sliding, "rocker" action of the cradle 23 so that it can be forced from its frontally convex storage mode, to a frontally concave dispensing mode when tab 26 is depressed. The shape of partition wall 14 may also vary within broad limits; however, a shape in which the lower rear quadrant of the partition wall is arcuate, being concave inwardly, facilitates the sliding, rocker motion referred to. Likewise, when the upper front quadrant and the front of the storage and dispensing device 10 are shaped so as to be generally concave inwardly, the projection and grasping of saw blade 22 is facilitated when the device is disposed in its dispensing mode.

Figure 4:
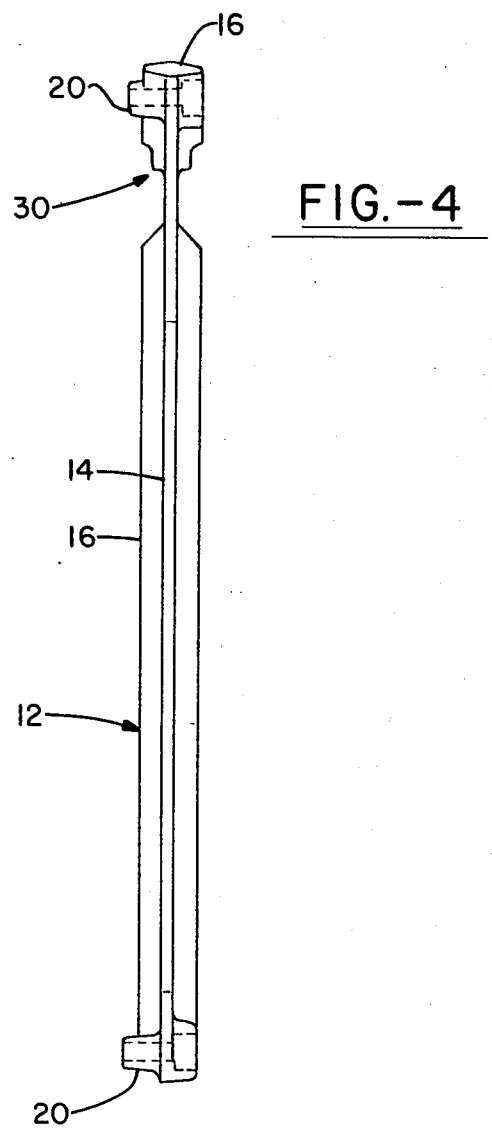
FIG. 4 is a front elevation of a partition module of the invention.

FIG. 4 is a front elevation of a partition module 12 of the invention showing details of the partition wall 14 and retainer flange 16. Also shown, are fastener housings 20 accommodating connection of adjacent modules, and anchor fastener aperature 30, as well as the discontinuity of flange 16 at the latter point. Again, in the case of the saw blades described in the preceding, and although the dimensions may be varied therefrom, it has been found desirable to adjust the width of the retainer flange 16 so that it is from about ½ inch to ¾ inch wide, a width of about ⅝ inch being typical. The components of the storage and dispensing device 10, including both the partition module 12 and the saw cradle 23 can be made from various materials for example metal or plastic; however, among other things, the use of plastic facilitates the inexpensive fabrication of the components, for example, by injection molding, and is preferred. Of such plastics, the use of rigid plastics, for instance polystyrene, has been found to be particularly advantageous. While the Figure shows provision for a flange 16, the partition module 12 could also be fitted with alternative structure, for example, peripheral spacers extending from partition wall 14 capable of maintaining the position of adjacent partition modules 12, relative to each other.

Figure 5:
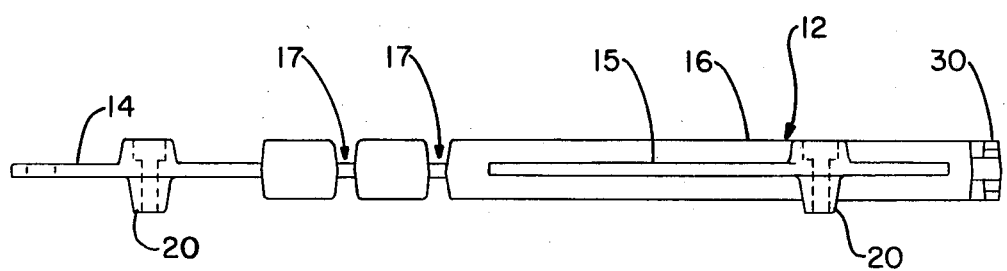
FIG. 5 is a bottom view of the partition module of FIG. 4.

FIG. 5 is a bottom view of the partition module 12 of FIG. 4 showing further details of the partition wall 14, retainer flange 16, and fastener housings 20. Also shown is an additional view of base support 15 and details of the anchor fastener aperature 30. Drain openings 17, although not absolutely necessary, are of considerable advantage in eliminating contaminants such as sawdust, dirt, and accumulated fluids, for example, water or oil.

Figure 6:
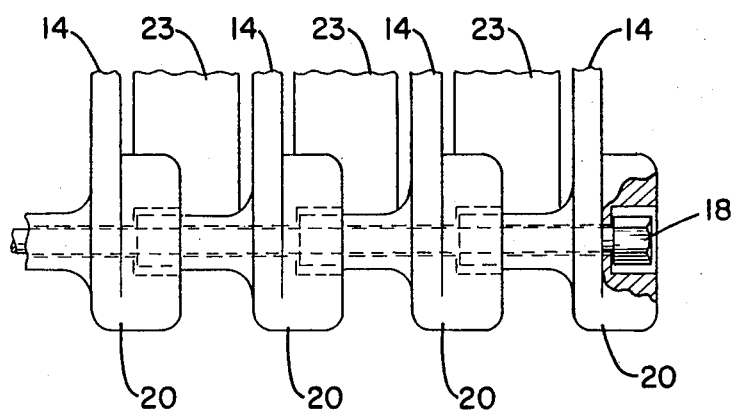
FIG. 6 is a broken out portion of the fastener housings of FIG. 1 showing details of their interconnection.

FIG. 6 is a broken out portion of the fastener housings 20 of FIG. 1, showing details of their interconnection. As indicated in the Figure, which also shows portions of partition walls 14 with saw cradles 23 positioned therebetween, and while other systems of interconnection may be used, it has been found convenient to provide the fastener housings 20 with a shape which allows their "nested" positioning relative to each other. When so positioned, the fastener housing 20 may be laterally interconnected by means of bolt 18, or other suitable fastener. In addition, and if desired, the head of the fastening bolt 18 may itself be drilled and tapped to accomodate an adjacent bolt 18 so as to permit assemblies of attached partition modules 12 to be connected together by removing the nut from the end of one such assembly and inserting the threaded end into the head of an adjacent assembly.

While in accordance with the patent statutes, a preferred embodiment and best mode has been presented, the scope of the invention is not limited thereto, but rather is measured by the scope of the attached claims.

What is claimed is:

1. A disc storage and dispensing device comprising a plurality of connected partition modules in combination with dispensing cradles adapted to hold relatively thin discs therein, one cradle being disposed between each pair of adjacent partition modules, each said cradle having actuating means located on one end thereof with a boss adjacent said means on one side of said cradle, said means extending from the front of said device between a pair of adjacent partition modules, and in its disc storage position, said boss extending through an arcuate guide slot located near the front edge of an adjacent partition module, said guide slot and said cradle both being disposed in a substantially convex position with respect to the front of said device, and when the dispensing disc is desired, said actuating means is pressed downward, causing said boss to follow said guide slot downward, and said cradle is thereby moved into a substantially concave position with respect to the front of said device, forcing its contained disc to partially project from the front of the device, where the disc is easily grasped and removed, and wherein the front, and the lower rear quadrant of said partition modules have a substantially arcuate shape, and wherein said partition modules are fitted with a flange, said flange being disposed at right angles to, and around a substantial portion of the top, bottom and rear periphery of said partition modules, and in which drain openings are provided in the bottom periphery of said flange, and the rear portion of said flange is notched and provided with an offset adapted to receive an anchor fastener, there being at least a sufficient number of partition modules laterally connected together by means of fasteners to form a stable assembly.

2. A device according to claim 1 in which said cradle is fitted with a groove adapted to receive the edge of a disc, and said means is a tab.

* * * * *